United States Patent
Hasezaki et al.

[11] Patent Number: 5,911,920
[45] Date of Patent: Jun. 15, 1999

[54] MANUFACTURING METHOD FOR LI COMPOSITE OXIDES EMPLOYED AS ELECTRODE MATERIALS IN LI BATTERIES

[75] Inventors: Kazuhiro Hasezaki; Hikaru Motomura; Masatomo Kamada, all of Nagasaki, Japan

[73] Assignee: Mitsubishi Heavy Industries, Ltd., Tokyo, Japan

[21] Appl. No.: 09/042,574

[22] Filed: Mar. 17, 1998

[30] Foreign Application Priority Data

Mar. 25, 1997 [JP] Japan ..................................... 9-071604
Dec. 17, 1997 [JP] Japan ..................................... 9-347787

[51] Int. Cl.$^6$ .............................. H01B 1/08; C01D 15/02; H01M 4/36
[52] U.S. Cl. ...................................... 252/518.1; 252/520.2; 252/521.2; 423/179.5; 423/593; 423/594; 423/598; 423/599; 429/218.1; 429/223; 429/224
[58] Field of Search ................................ 423/179.5, 599, 423/594, 593, 598, 263, 600; 429/218.1, 224, 223; 419/48, 31, 32, 33, 34, 86, 63; 252/520.2, 521.2, 518.1; 75/10.48, 348

[56] References Cited

U.S. PATENT DOCUMENTS

| | | | |
|---|---|---|---|
| 4,526,855 | 7/1985 | Hartwig et al. | 429/191 |
| 5,700,442 | 12/1997 | Bloch et al. | 423/599 |
| 5,780,181 | 7/1998 | Idota et al. | 429/194 |

*Primary Examiner*—Mark Kopec
*Assistant Examiner*—Derrick G. Hamlin
*Attorney, Agent, or Firm*—Oblon, Spivak, McClelland, Maier & Neustadt, P.C.

[57] ABSTRACT

It is an object of the present invention to provide a manufacturing method for Li composite oxides employed as electrode materials for Li ion batteries which is capable of obtaining Li composite oxides having a stable composition using heat treatment at comparatively low temperatures.

An Li source compound and an M source compound (where M is one or more elements selected from a group containing Mn, Ni, Co, Fe, V, Ti, Sc, Y, and Al) having an element M in a composite with Li are mixed at predetermined proportions. A chemical reaction is caused by pulverizing and mixing this raw material mixture in an inert gas atmosphere. The pulverization, mixing, and reaction are continued until the raw material can no longer be detected. After pulverization and mixing, the raw material mixture is subjected to heat treatment by heating it to a temperature within a predetermined range.

15 Claims, 7 Drawing Sheets

MANUFACTURING METHOD FOR LI COMPOSITE OXIDES EMPLOYED AS ELECTRODE MATERIALS IN LI BATTERIES

BACKGROUND OF THE INVENTION

1. Field of the Invention

The present invention relates to a manufacturing method for Li composite oxides which are applied as electrode materials in Li ion batteries.

The present application is based on Japanese patent applications (Japanese Patent Application No. HEI 9-71604, Japanese Patent Application No. HEI 9-347787), and the contents of the Japanese applications incorporate a portion of the present specification.

2. Related Art

Conventionally, Li composite oxides used as electrode materials in Li ion batteries, such as LiMn composite oxides or LiNi composite oxides or the like, were produced by a method termed the fusion impregnation method.

For example, an LiMn composite oxide having an $Li_{0.33}MnO_4$ composition is produced by the following method. First, lithium nitrate ($LiNO_3$) and manganese (IV) oxide ($MnO_2$) having a surface area of 20 $m^2/g$ or more are weighed out and mixed so as to achieve a ratio of Li:Mn= 1:3, and a raw material mixture is thus created. Next, this raw material mixture is heated for approximately 5 hours at a temperature above the melting point of $LiNO_3$ of 260° C. (commonly, at approximately 300° C.). By means of this heating, the $LiNO_3$ in the molten raw material mixture is impregnated in the $MnO_2$. After this heating, the raw material mixture is termed the reaction mixture. This reaction mixture is heated for a period of 10 hours in a nitrogen atmosphere at a temperature of 350° C., and thereby $NO_x$ gas is released from the reaction mixture, and $Li_{0.33}MnO_4$ is obtained.

Furthermore, an LiMn composite oxide having an $LiMn_2O_4$ composition is produced in the following manner. First, manganese (IV) oxide and lithium nitrate are mixed so as to obtain a ratio Li:Mn=1:2, and a raw material mixture is thus produced. Next, in the same manner as described above, the raw material mixture is heated, and the $LiNO_3$ present in the raw material mixture is impregnated in the $MnO_2$. Next, the reaction mixture obtained is heated for a period of ten hours in a nitrogen atmosphere at a temperature of 650° C., and by means of the release of $NO_x$ gas, $LiMn_2O_4$ is obtained.

Furthermore, other Li composite oxides are produced by the following method. First, an Li oxide and a composite oxide powder of Co, Ni, Mn or the like, or a carbonate of Co, Ni, Mn, or the like, are mixed at a predetermined molar ratio to produce a raw material mixture. Next, this raw material mixture is heated to approximately 700° C. The reaction mixture obtained is again mixed and subjected to heat treatment, then a predetermined Li composite oxide is obtained.

In the method employing $LiNO_3$ as the raw material as described above, $NO_x$ gas is emitted in the final stage of the manufacturing process. In this method, large scale disposal devices are required in order to remove the $NO_x$ gas, and thus the large scale production of Li composite oxides was extremely difficult. Furthermore, it was necessary to employ Mn oxides having a large surface area as the other raw material.

Furthermore, in the method which Li oxides are used as the raw material, it was necessary to repeatedly conduct heat treatment at high temperatures. However, since Li tends to evaporate at high temperatures, it was difficult to obtain Li composite oxides having the predetermined composition. Furthermore, defects were produced in the crystalline structure of the Li composite oxides obtained, and there were thus undesirable large variations in the electrical properties thereof.

SUMMARY OF THE INVENTION

The present invention was created in light of the above circumstances; it has as an object thereof to provide a manufacturing method for Li composite oxides which does not require the use of raw materials having a large surface area.

Furthermore, it is an object of the present invention to provide a manufacturing method for Li composite oxides which does not cause the release of $NO_x$ gas during the manufacturing process.

Furthermore, it is an object of the present invention to provide a manufacturing method for Li composite oxides which is capable of obtaining Li composite oxides having a stable composition by means of heat treatment at comparatively low temperatures.

In this invention, a raw material mixture, in which an Li source compound and an M source compound (where M represents 1 or more elements selected from a group containing Mn, Ni, Co, Fe, V, Ti, Sc, Y, and Al) serving as a source for the element M composited with Li, are mixed at a predetermined proportion, is pulverized and mixed in an inert atmosphere, and thereby a chemical reaction is caused, and this pulverization, mixing, and reaction is continued until the raw material can no longer be detected, whereupon heat treatment is conducted.

In accordance with the present invention, it is possible to obtain Li composite oxides having a predetermined $LiMn_2O_4$ or $LiNiO_2$ composition or the like simply by conducting a chemical reaction by means of pulverization and mixing followed by a heat treatment.

Furthermore, in accordance with the present invention, nitrate compounds are not employed as raw materials, so that $NO_x$, which is extremely harmful to humans, is not generated. For this reason, the present invention may be applied to large scale manufacture and contributes to environmental protection.

Furthermore, in accordance with the present invention, it is possible to synthesize the Li composite oxides which are employed as electrodes in Li ion batteries at comparatively low temperatures, so that the evaporation of the lithium during heat treatment is suppressed. Accordingly, there are no defects in the crystalline structure of the Li composite oxides. For this reason, the doping and undoping of the Li ions from the Li composite oxide during charge and discharge is conducted smoothly, and a material is obtained for the electrodes of Li ion batteries which has a large capacity and has superior cycle characteristics.

BRIEF DESCRIPTION OF THE DIAGRAMS

BEST MODE FOR CARRYING OUT THE INVENTION

Figure 1:
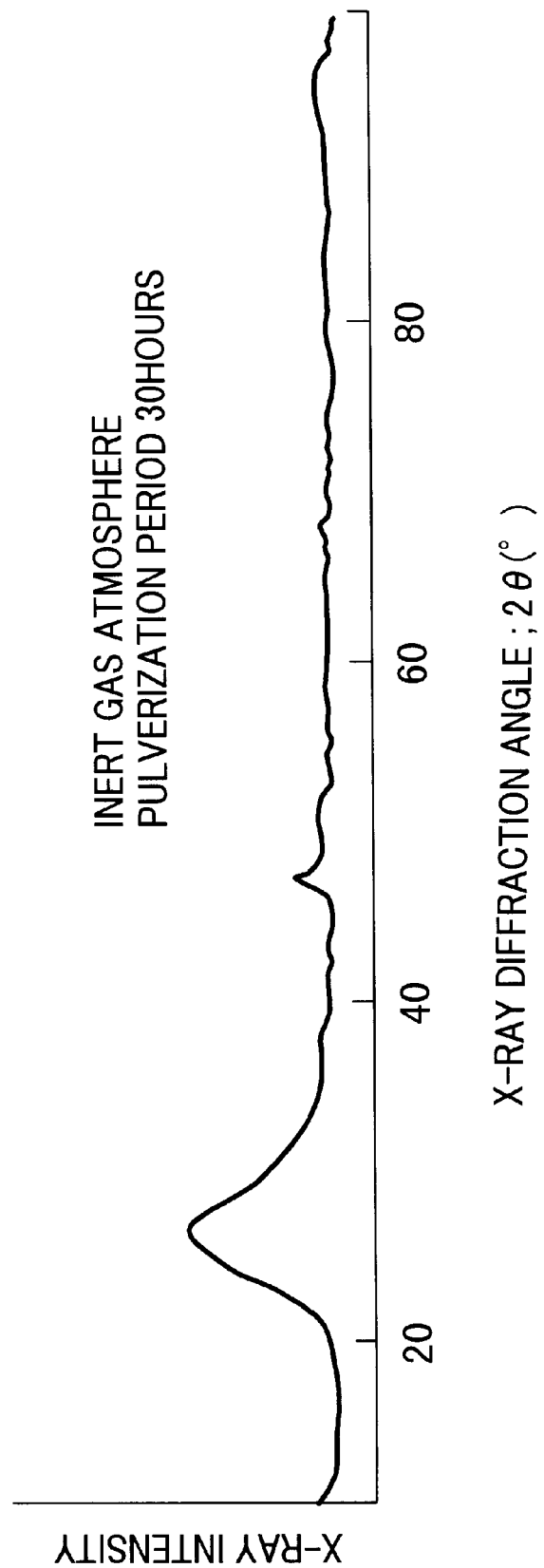
FIG. 1 shows the results of X-ray diffraction of the $Li_{0.33}MnO_2$ in embodiment 1.

In the manufacturing method for Li composite oxides in accordance with the present invention, it is possible to employ metallic lithium (Li), lithium oxide ($Li_2O$), lithium hydroxide (LiOH or $LiOH·H_2O$), lithium carbonate ($Li_2Co_3$), or the like as the Li source compound which forms the raw material of the Li composite oxide. In particular, the use of lithium hydroxide (LIOH or $LiOH.H_2O$) is preferable as the Li source compound. By using lithium hydroxide, it is possible to prevent the emission of $NO_x$ gas during the manufacturing process. Furthermore, as described hereinafter, it is necessary that the heat treatment temperature be 350° C. or less in the case of $Li_{0.33}MnO_2$ structure, so that the use of lithium hydroxide (LiOH) containing no crystallization water is particularly preferable.

Any M source compound may be used as the raw material in the Li composite oxides in so far as it does not produce harmful gases in the subsequent heat treatment process.

Examples of preferable M source compounds include, using the example of Mn sources, metallic manganese (Mn), manganese (IV) oxide ($MnO_2$), and manganese oxyhydroxide [MnO(OH)], and the like.

Furthermore, examples of preferable M source compounds which serve as Ni sources include, for example, metallic nickel (Ni), nickel (II) oxide (NiO), and nickel (II) hydroxide [$Ni(OH)_2$].

Additionally, examples of preferable M source compounds which serve as Co sources include metallic cobalt (Co), and cobalt (II) oxide (CoO).

Additionally, examples of preferable M source compounds which serve as Fe sources include metallic iron (Fe), and iron oxides ($Fe_3O_4$, $Fe_2O_3$)

Additionally, examples of preferable M source compounds which serve as V sources include metallic vanadium (V), and vanadium oxides (VO, $V_2O_3$, $V_2O_5$, $VO_2$, and $V_3O_5$).

Furthermore, examples of preferable M source compounds which serve as Ti sources include metallic titanium (Ti), and titanium oxide ($TiO_2$).

Additionally, examples of preferable M source compounds which serve as Sc sources include metallic scandium (Sc), and scandium oxides (ScO, $Sc_2O_3$).

Additionally, examples of preferable M source compounds which serve as Y sources include metallic yttrium (Y) and yttrium oxide ($Y_2O_3$).

Additionally, examples of preferable M source compounds which serve as Al sources include metallic aluminum (Al) and aluminum oxide ($Al_2O_3$).

In the manufacturing method for Li composite oxides of the present invention, the Li composite oxides are produced by means of the following processes.

First, an Li source compound such as the lithium hydroxide described above (which may be hydrated) is mixed with an M source compound such as manganese (IV) oxide, nickel (II) oxide, or the like so as to achieve a predetermined molar ratio (atomic ratio), thus producing a raw material mixture.

Next, by means of forcibly pulverizing and mixing this raw material mixture, the Li source compound and M source compound are caused to chemically react (mechanical alloying treatment). The pulverization and mixing must be sufficiently conducted using a machine for such pulverization and mixing such a vibrating mill, a roller mill, an atoraita, a planetary ball mill, specs or the like.

By means of this pulverization and mixing, the reaction surface of, in particular, the Mn oxide raw material is increased. At the same time, as a result of the collision energy of the raw material powder, a chemical reaction is promoted. Accordingly, in the manufacturing method for Li composite oxides of the present invention, it is not necessary to employ raw materials having a large surface area. By means of pulverizing the Mn oxide, the effective surface area of the Mn oxide is increased. Furthermore, by means of the heat generated as a result of the forcible pulverization and mixing, an Li composite oxide is produced.

In the pulverization and mixing, the raw material undergoes a chemical reaction, and this continues until the production of a non-crystalline phase or the desired Li composite oxide without any residual raw material.

The standard for halting the pulverization mixture is determined in the following manner. First, the reaction mixture obtained by the pulverization and mixing is subjected to X-ray diffraction analysis. From the results of the analysis, if raw material is present, pulverization and mixing are again continued. Pulverization and mixing are continued until raw material can not be detected by X-ray diffraction.

Furthermore, pulverization and mixing are continued until either a broad diffraction peak indicating a non-crystalline substance or the diffraction peak of the desired Li composite oxide is detected.

With respect to the pulverization and mixing, the chemical reaction is unlikely to proceed in the presence of an atmosphere containing oxygen, so that it is necessary to conduct this in an inert atmosphere of argon, nitrogen, or the like.

There are cases in which, as a result of the heat generated during pulverization and mixing, the temperature of the reaction mixture becomes too high, and the Li composite oxide having the desired composition becomes unattainable. For example, with the $Li_{0.33}MnO_2$ composition, when the temperature exceeds 350° C. during production, LiMn oxides other than $Li_{0.33}MnO_2$ are produced. Accordingly, it is preferable to provide an appropriate cooling mechanism, for example, a water cooling mechanism, in the pulverization and mixing mechanism during the production of the Li composite oxide.

At the point at which the pulverization and mixing are stopped, the reaction mixture has become the Li composite oxide; however, crystallization water or thermodynamically unstable substances (amorphous Li composite oxides) are also produced. This crystallization water or thermodynamically unstable substances tend to interfere with (suppress) the Li ion battery properties. Accordingly, the removal of crystallization water and the conversion of thermodynamically unstable substances to stable substances, by means of heat treatment, are necessary.

This heat treatment is conducted by maintaining the mixture obtained by the pulverization and mixing at a predetermined temperature for a period within a range of 1–30 hours. By means of such heat treatment, the crystallization water within the Li composite oxide is removed. Furthermore, by means of this heat treatment, the crystallization of the Li composite oxide is promoted, and an Li composite oxide of uniform quality with a desired composition can be obtained.

The temperature of the heat treatment may be appropriately set in accordance with the type of composite oxide desired. For example, in the case in which an $Li_{0.33}MnO_2$ composition is to be produced, the temperature of the heat treatment is preferably within a range of 100–350° C. Furthermore, a range of 450–750° C. is appropriate in the case of $LiMn_2O_4$, $LiNiO_2$, $LiCoO_2$, or $LiTi_2O_4$ compositions.

When the temperature of the heat treatment is not within such ranges, there are cases in which an Li composite oxide having the desired composition can not be obtained, so that this is not preferable.

When an Li composite oxide is produced in accordance with the present invention, the effects of the atmosphere during the heat treatment on the properties of the Li composite oxide are negligible. Accordingly, it is generally not necessary to control this atmosphere.

However, depending on the type of Li composite oxide, the tendencies of the atmospheres which are preferable may be different, so that the atmospheres may be appropriately selected. For example, in the case of an $Li_{0.33}MnO_2$ composition or $LiMn_2O_4$ composition, by using an inert gas atmosphere, it is possible to achieve an improvement in the properties of the resulting substance, such as a slight increase in discharge capacity. Furthermore, in the case of $LiNiO_2$ composition, it is preferable to conduct heat treatment in an oxygen atmosphere. Furthermore, in the case of $LiCoO_2$ composition and an $LiTi_2O_4$ composition, it is preferable that heat treatment be conducted in the ambient atmosphere.

It is not particularly necessary to control the pressure during the heat treatment process. However, by means of increasing the pressure, it is possible to accelerate the reaction by which the desired Li composite oxide is formed. Accordingly, by means of increasing the pressure during the heat treatment, it is possible to shorten the heat treatment period.

The elements which are present in the composite together with lithium are not particularly restricted to one type of element. The manufacturing method for Li composite oxides of the present invention is effective in the manufacture of oxides in which a number of elements are present in the composite, such as $LiMn_{1.6}Co_{0.2}O$, $LiFeMnVO_3$, and the like.

The Li composite oxides obtained by means of the manufacturing method for Li composite oxides of the present invention have superior properties for use as electrode materials for Li ion batteries. In particular, $Li_{0.33}MnO_2$, $LiMn_2O_4$, $LiNiO_2$, $LiCoO_2$, and the like possess the properties of anode materials. Furthermore, it is also possible to apply the method to obtain materials which may be used as cathodes, such as $LiTi_2O_4$.

Embodiment 1

An LiMn composite oxide ($Li_{0.33}MnO_2$) was produced using the method of the present invention.

First, LiOH was prepared as an Li source compound, while $MnO_2$ was prepared as an M source compound. It was not necessary to provide $MnO_2$ having a large surface area.

The $MnO_2$ (having a surface are of 0.1 $m^2/g$ or less) and the LiOH were weighed out and mixed so as to achieve a ratio of Li:Mn=1:3 (atomic ratio). This raw material mixture was placed in a vibration mill made of stainless steel and having a capacity of 2,000 ml which was filled with an argon gas atmosphere. Next, the vibrating mill was reduced in pressure to 0.1 Pa. Furthermore, argon gas having a purity of 4 N (a purity of 99.99%) was introduced into the vibration mill, and the pressure within the vibration mill was set to 0.1 MPa.

The amount of raw material mixture placed in the mill was 100 g. A pulverization ball (made from partially stabilized zirconia) was placed in the vibration mill. The weight ratio of the pulverization ball and the raw material mixture was 40:1.

Furthermore, the vibration mill was caused to vibrate, the raw materials were pulverized and mixed, and a chemical reaction occurred. The reaction was allowed to proceed while cooling the vibration mill so that the temperature of the raw material did not exceed 350° C. Furthermore, the chemical reaction was continued for 30 hours. By means of the chemical reaction induced by the pulverization and mixing, it was possible to obtain the predetermined $Li_{0.33}MnO_2$. The results of an X-ray diffraction of this $Li_{0.33}MnO_2$ are shown in FIG. 1. Since the chemical reaction occurred as a result of sufficient pulverization and mixing, the intermolecular distance of the molecules comprising the $Li_{0.33}MnO_2$ became irregular and a non-crystalline state resulted.

Furthermore, in FIG. 1, the diffraction peaks of the raw material LiOH and $MnO_2$ were not detected.

Figure 2:
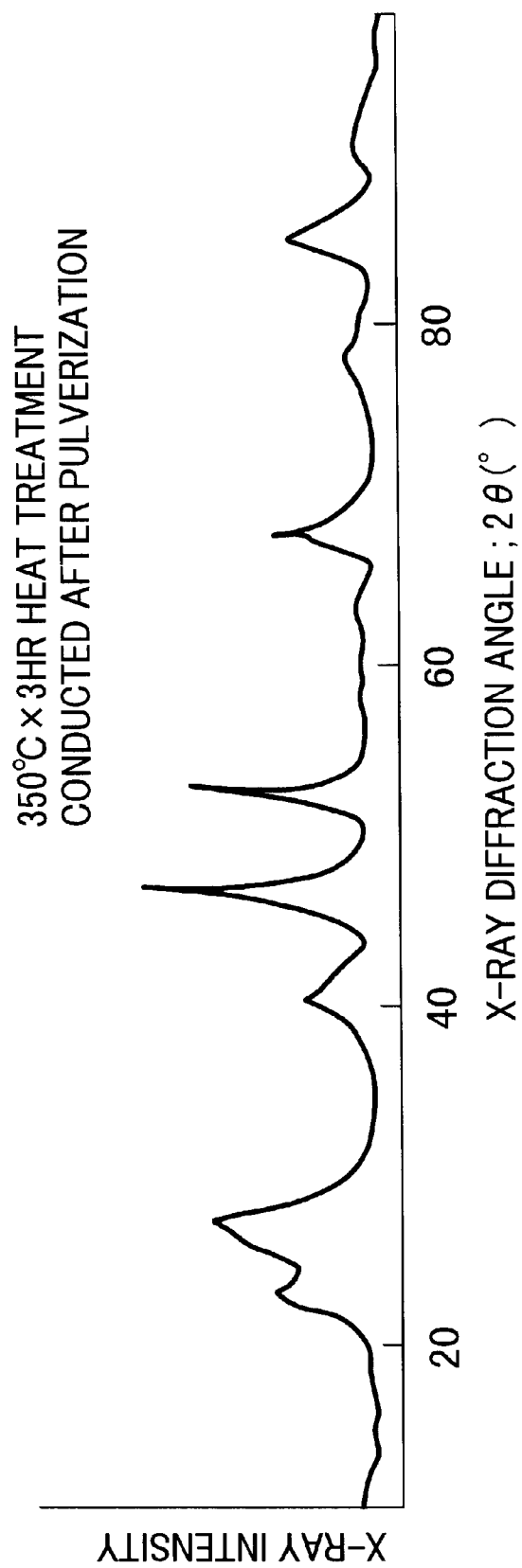
FIG. 2 shows the results of X-ray diffraction of the $Li_{0.33}MnO_2$ in embodiment 1.

After pulverization and mixing, the non-crystalline $Li_{0.33}MnO_2$ produced was subjected to heat treatment. The heat treatment was conducted for a period of 3 hours in a nitrogen atmosphere at a temperature of 350° C. By means of this heat treatment, the $Li_{0.33}MnO_2$ desired was obtained. The results of an X-ray diffraction of the $Li_{0.33}MnO_2$ after heat treatment are shown in FIG. 2.

Embodiment 2

An LiMn composite oxide ($LiMn_2O_4$) was produced using the method of the present invention.

First, $LiOH·H_2O$ was prepared as the Li source compound while $MnO_2$ (with a surface area of 0.1 $m^2/g$ or less) was prepared as the M source compound.

100 g of a raw material mixture, in which 19.4 g of lithium hydroxide monohydrate ($LiOH·H_2O$) was mixed with 80.6 g of manganese (IV) oxide ($MnO_2$) (Li:Mn=1:2), were placed in a stainless steel vibration mill having an internal volume of 2,000 ml. Furthermore, a pulverization ball made of partially stabilized zirconia ($ZrO_2 - Y_2O_3$) was inserted into the vibration mill. The weight ratio between the pulverization ball and the raw material mixture was 40:1.

The pressure within the vibration mill was reduced to 0.1 Pa. Furthermore, argon gas having a purity of 4 N was introduced into the vibration mill, and the interior of the vibration mill was pressurized to 0.1 MPa.

Furthermore, the vibration mill was caused to vibrate, and a chemical reaction was carried out as a result of the pulverization and mixing which resulted. The reaction period was 30 hours.

After the reaction resulting from the pulverization and mixing had gone to completion, heat treatment was conducted in order to remove the crystallization water component present in the LiMn composite oxide and to promote crystallization. The heat treatment was conducted for a period of 3 hours in a nitrogen atmosphere at a temperature of 650° C. In this manner, $LiMn_2O_4$ was obtained.

Embodiment 3

An LiNi composite oxide ($LiNiO_2$) was produced using the method of the present invention.

First, LiOH.H$_2$O was prepared as the Li source compound, while Ni(OH)$_2$ was prepared as the M source compound.

100 g of a raw material mixture, in which 31.4 g of lithium hydroxide monohydrate (LiOH.H$_2$O) was mixed with 68.6 g of nickel (II) hydroxide [Ni(OH)$_2$] (Li:Ni=1:1), was placed in a stainless steel vibration mill having an internal volume of 2,000 ml. Furthermore, a pulverization ball made of partially stabilized zirconia (ZrO$_2$ –Y$_2$O$_3$) was inserted into the vibration mill. The weight ratio of the pulverization ball and the raw material mixture was 40:1.

The interior of the vibration mill was reduced in pressure to 0.1 Pa. Furthermore, argon gas having a purity of 4 N was introduced into the vibration mill, and the pressure within the vibration mill was set to 0.1 Mpa.

Additionally, the vibration mill was caused to vibrate, and a chemical reaction was carried out as a result of the pulverization and mixing. The reaction period was 30 hours.

After the reaction resulting from the pulverization mixing went to completion, heat treatment was conducted in order to remove the crystallization water component within the LiNi composite oxide and in order to promote crystallization. The heat treatment was conducted for a period of 3 hours in an oxygen atmosphere at a temperature of 700° C. In this way, LiNiO$_2$ was obtained.

Embodiment 4

Li composite oxides (LiMn$_2$O$_4$, LiNiO$_2$, and LiCoO$_2$) were produced using the method of the present invention.

Figure 3:
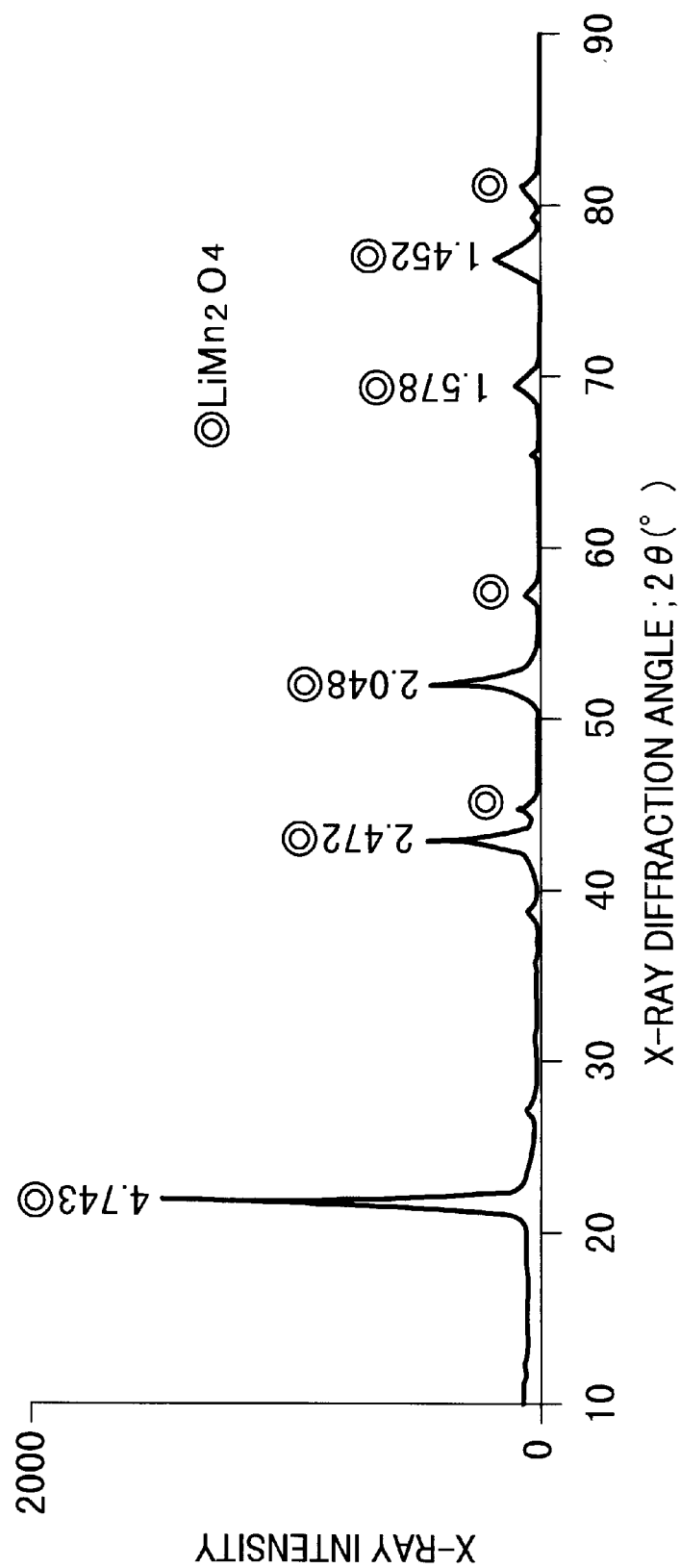
FIG. 3 shows the results of X-ray diffraction of the $LiMn_2O_4$ obtained in embodiment 4.

First, lithium hydroxide and manganese (IV) oxide were mixed so as to produce a predetermined molar ratio (Li:Mn=1:2). This raw material mixture was placed in a stainless steel container into which a zirconia ball was placed. Next, the atmosphere within the container was replaced with argon gas. This container was vibrated using a roller mill, and pulverization and mixing were conducted for a period of 300 hours. In this way, an amorphous reaction mixture was obtained. Next, this reaction mixture was subjected to heat treatment. The heat treatment was conducted for a period of 3 hours in the ambient atmosphere at 450° C. or 750° C. In this way, LiMn$_2$O$_4$ having a spinel structure was obtained. In FIG. 3, the results of an X-ray diffraction of the LiMn$_2$O$_4$ subjected to heat treatment at 750° C. are shown.

Figure 4:
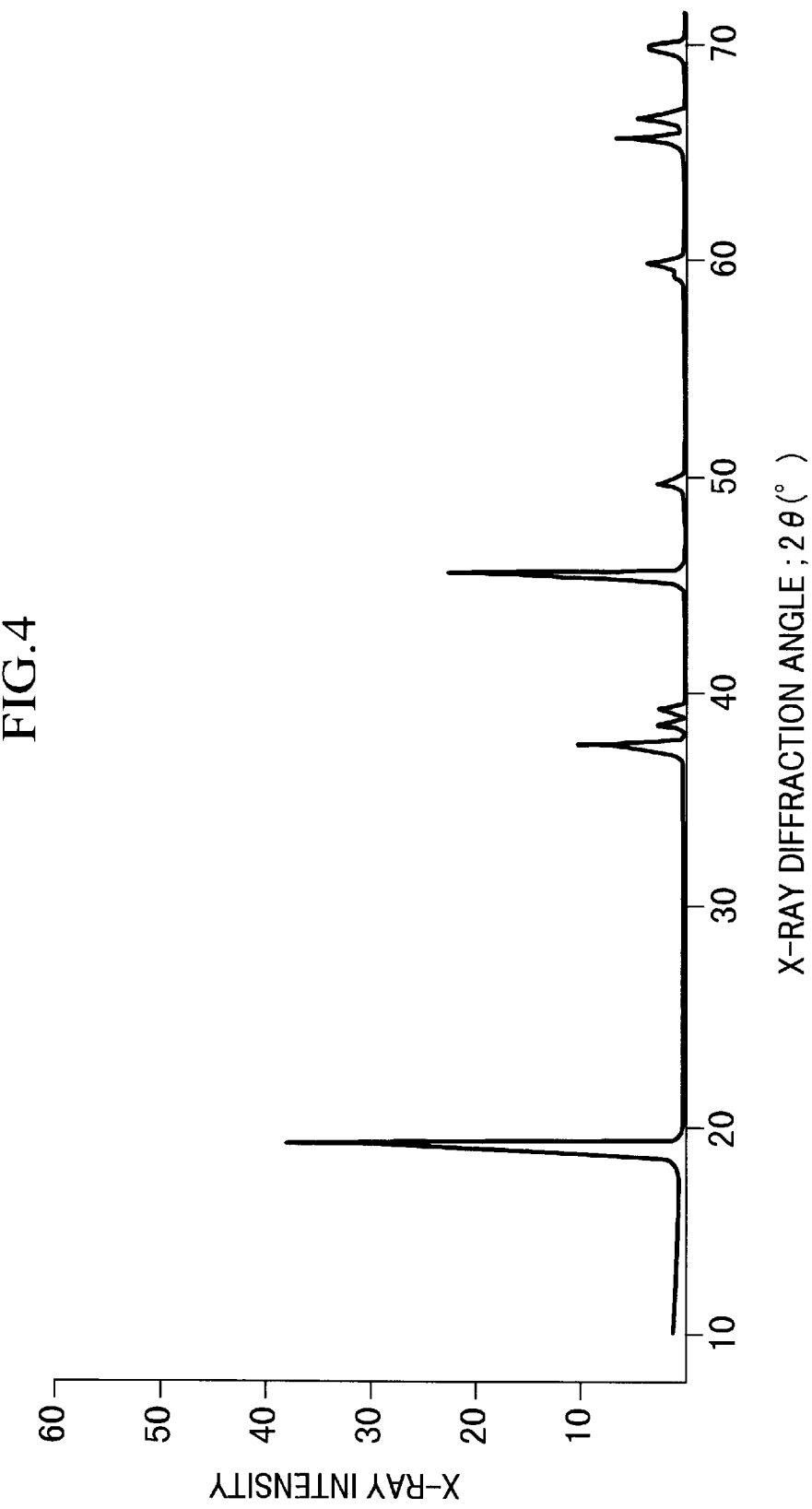
FIG. 4 shows the results of X-ray diffraction of the $LiCoO_2$ obtained in embodiment 4.

Furthermore, in place of the manganese (IV) oxide described above, nickel (II) oxide and cobalt (II) oxide were mixed with the lithium hydroxide. The same processes were carried out with respect to this raw material mixture, and LiNiO$_2$ and LiCoO$_2$ were obtained. FIG. 4 shows an X-ray diffraction graph of the LiCoO$_2$ (subjected to heat treatment at 750° C.) which was obtained.

Embodiment 5

An LiTi composite oxide (LiTi$_2$O$_4$) was produced using the method of the present invention.

Figure 5:
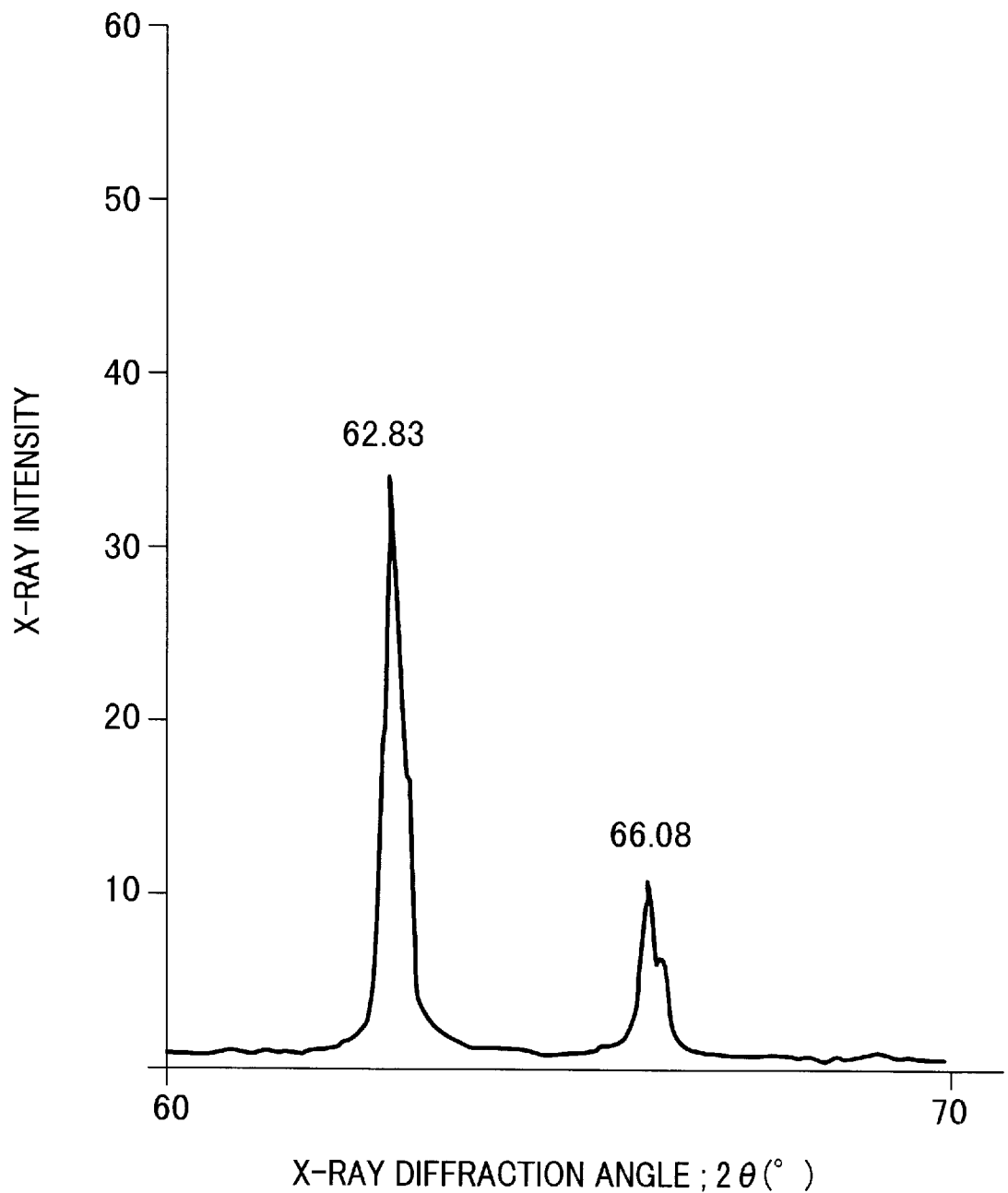
FIG. 5 shows the results of X-ray diffraction of the $LiTi_2O_4$ obtained in embodiment 5.

First, lithium hydroxide and titanium oxide were mixed so as to obtain a predetermined molar ratio (Li:Ti=1:2). This raw material mixture was placed in a stainless steel container containing a zirconia ball. Next, the atmosphere within the container was exchanged with argon gas. This container was vibrated using a roller mill, and pulverization and mixing were carried out for a period of 300 hours. In this way, an amorphous reaction mixture was obtained. Next, this reaction mixture was subjected to heat treatment. The heat treatment was conducted for a period of 3 hours in the ambient atmosphere at a temperature of 650° C. In this way, LiTi$_2$O$_4$ was obtained. FIG. 5 shows an X-ray diffraction graph of the LiTi$_2$O$_4$.

Experimental Example 1

Lithium ion batteries were produced using anodes which employ the Li composite oxides produced in embodiments 1 through 3, and charge and discharge tests were carried out.

First, 50 mg of each of the Li$_{0.33}$MnO$_2$ produced in embodiment 1, the LiMn$_2$O$_4$ produced in embodiment 2, and the LiNiO$_2$ produced in embodiment 3 were prepared. Next, these lithium composite oxides were kneaded together with 30 mg of conductive binder and were formed in a film shape. The film shaped Li$_{0.33}$MnO$_2$ was pressed into contact with a stainless steel mesh and an anode was thus formed. Furthermore, the film shaped LiMn$_2$O$_4$ and the LiNiO$_2$ were pressed into contact with an aluminum mesh to form anodes.

Cathodes were produced by pressing metallic lithium into contact with a stainless steel mesh.

A solution of LiPF$_6$ at a concentration of 1 mol.dm$^{-3}$ in a mixed medium of ethylene carbonate and diethyl carbonate (at a volumetric ratio of 1:1) was employed as the electrolyte solution.

The charge-discharge test was conducted under conditions such that the charge-discharge current density was 0.4 mA.cm$^{-2}$ (40 mA/g) and the voltage was within a range of 3.3–4.5 V. The results of an evaluation of the discharge capacity after 5 cycles are shown in Table 1.

From Table 1, it can be seen that the Li$_{0.33}$MnO$_2$, LiMn$_2$O$_4$ and LiNiO$_2$ produced in accordance with the method of the present invention had discharge capacities which were equivalent to those produced by conventional methods. Accordingly, it can be seen that these Li composite oxides posses superior properties for use as electrode materials for lithium ion batteries.

TABLE 1

| Sample | Discharge Capacity (mAh/g) |
| --- | --- |
| Li$_{0.33}$MnO$_2$ electrode of the present invention | 175 |
| LiMn$_2$O$_4$ electrode of the present invention | 120 |
| LiNiO$_2$ electrode of the present invention | 169 |
| Conventional Li$_{0.33}$MnO$_2$ electrode | 170 |
| Conventional LiMn$_2$O$_4$ electrode | 120 |
| Conventional LiNiO$_2$ electrode | 170 |

Experimental Example 2

An anode was produced using the LiMn$_2$O$_4$ obtained in embodiment 2. The production method was identical to that in experimental example 1.

The cathode was produced in the same manner as in experimental example 1.

Furthermore, a solution of LiClO$_4$ at a concentration of 1 mol.dm$^{-3}$ in a mixed medium of ethylene carbonate and diethyl carbonate (at a volumetric ratio of 1:1) was employed as the electrolyte solution.

Figure 6:
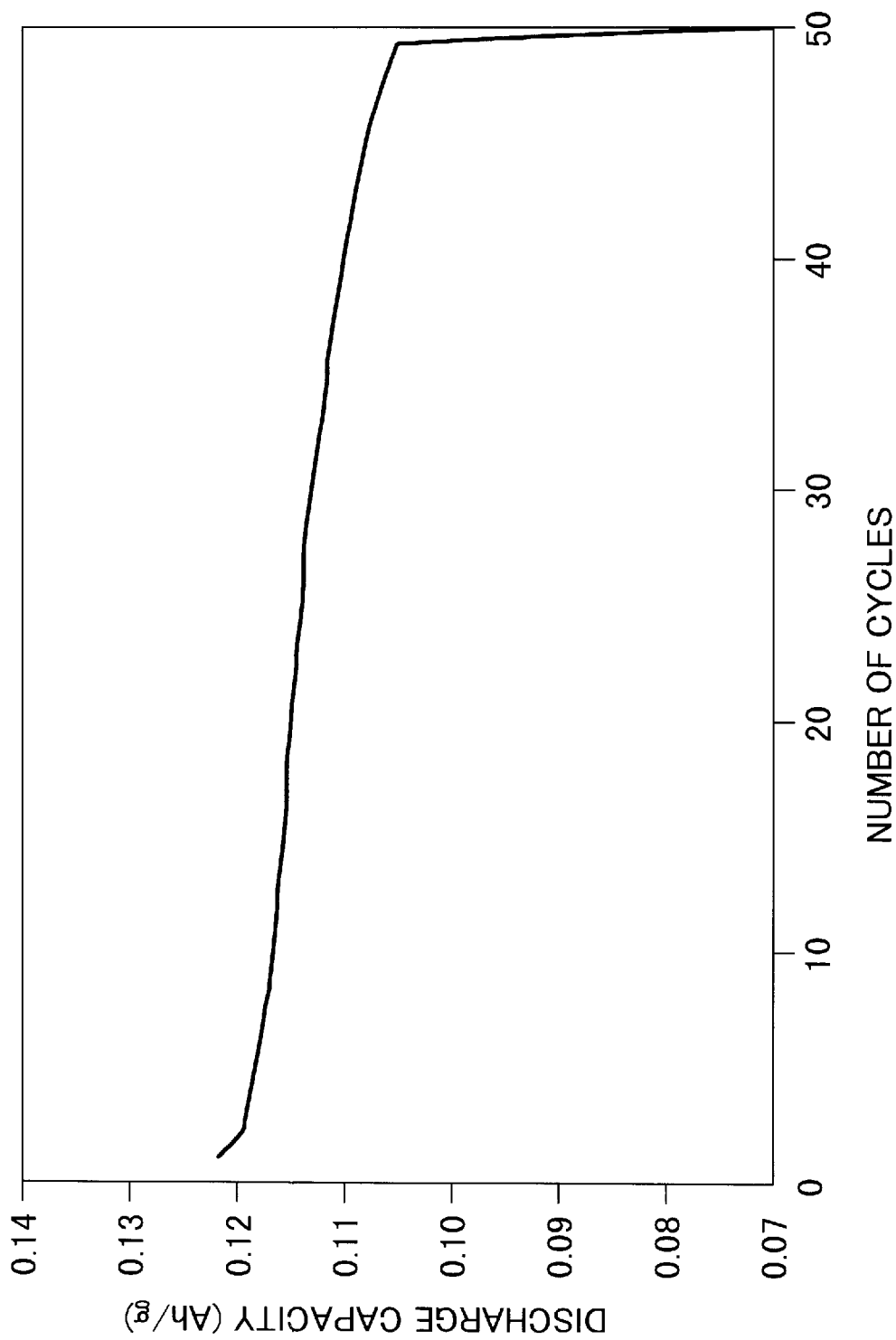
FIG. 6 shows the results of a charge and discharge test of an Li ion secondary battery employing the $LiMn_2O_4$ obtained in embodiment 2 as an anode material.

A lithium ion battery was produced using this anode, cathode, and electrolyte solution. Furthermore, the charge-discharge tests were conducted with respect to the Li ion battery under conditions identical to those of experimental example 1. The results of the charge-discharge tests are shown in FIG. 6.

It can be seen that this LiMn$_2$O$_4$ exhibits little decline in discharge capacity after repeated charging and discharging, and thus has stable properties.

Experimental Example 3

An anode was produced using the LiMn$_2$O$_4$ obtained in embodiment 4 in the same manner as in experimental example 1.

The cathode was produced by pressing metallic lithium into contact with a stainless steel mesh.

A solution of $LiPF_6$ at a concentration of 1 mol.dm$^{-3}$ in a mixed medium of ethylene carbonate and diethyl carbonate (at a volumetric ratio of 1:1) was employed as the electrolyte solution.

An Li battery was produced using this anode, cathode, and electrolyte solution.

Figure 7:
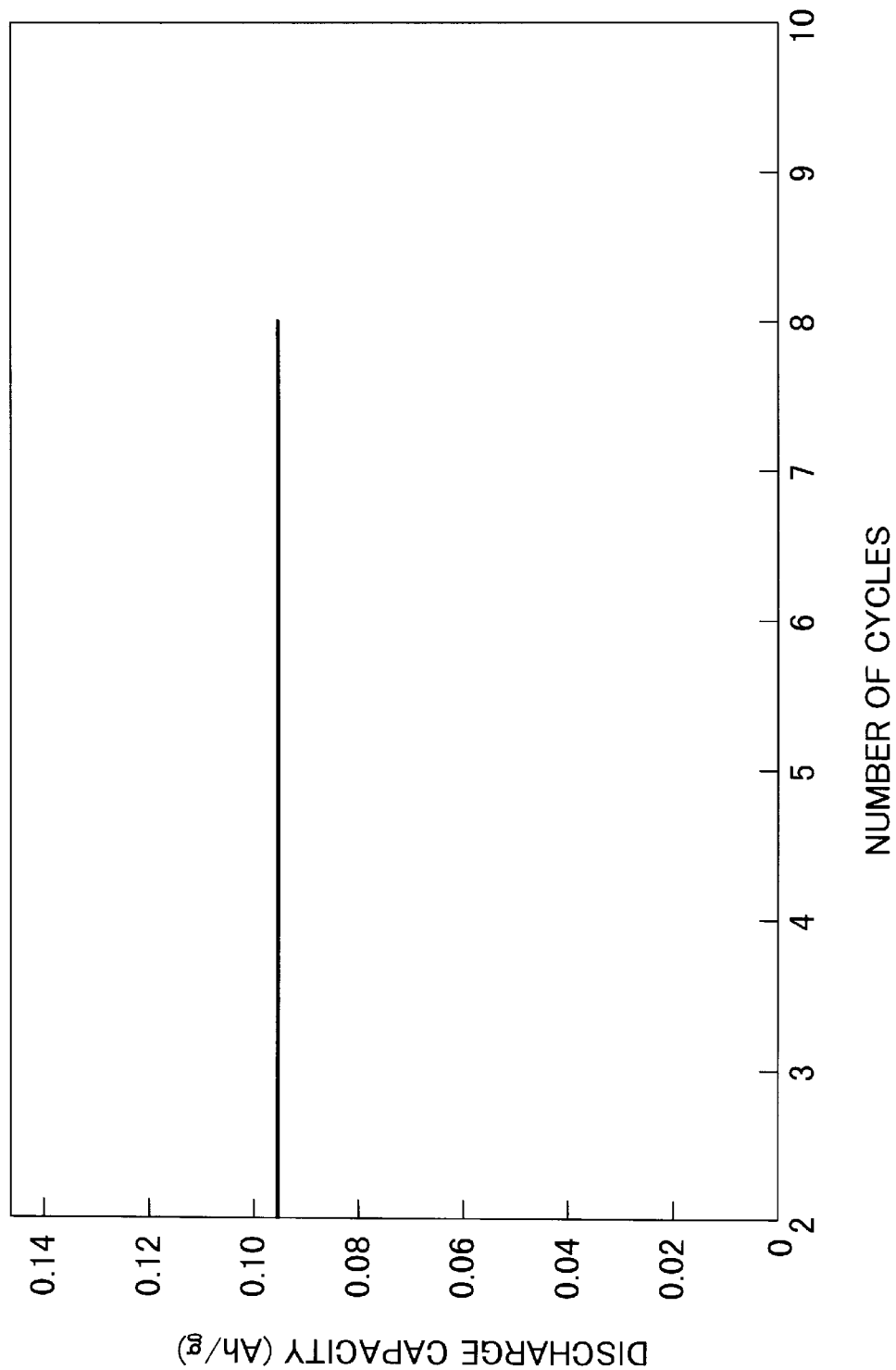
FIG. 7 shows the results of a charge and discharge test of an Li ion secondary battery produced using the $LiMn_2O_4$ obtained in embodiment 4 as an anode material.

Charge-discharge tests were conducted with respect to the Li ion battery obtained. Charge-discharge tests were repeatedly conducted under conditions such that the charge-discharge current density was 0.4 mA.cm$^{-2}$ (40 mA/g), and the voltage was within a range of 3.3–4.5 V. The results of the charge-discharge tests are shown in FIG. 7. As shown in FIG. 7, the lithium ion battery employing the $LiMn_2O_4$ produced by the method of the present invention maintained a stable discharge capacity even after repeated charging and discharging. Accordingly, it can be seen that this $LiMn_2O_4$ is suitable for use as a material for electrodes of secondary batteries.

What is claimed is:

1. A manufacturing method for Li composite oxides employed as electrode materials for Li ion batteries containing Li and one or more elements M (where M indicates one or more elements selected from a group containing Mn, Ni, Co, Fe, V, Ti, Sc, Y, and Al), wherein a raw material mixture, in which an Li source compound and a M source compound in which M is composited with Li are mixed at a predetermined proportion, is pulverized and mixed in an inert atmosphere, and thereby a chemical reaction is caused, and this pulverization, mixture, and reaction is continued until the raw material can no longer be detected, after which heat treatment is conducted.

2. A manufacturing method for Li composite oxides employed as electrode materials in Li ion batteries in accordance with claim 1, wherein said Li source compound comprises lithium hydroxide, and M comprises one selected from a group containing Mn, Ni, Co, and Ti.

3. A manufacturing method for Li composite oxides employed as electrode materials in Li ion batteries in accordance with claim 1, wherein said Li source compound comprises one of metallic lithium and lithium carbonate, and M comprises one selected from a group containing Mn, Ni, Co, and Ti.

4. A manufacturing method for Li composite oxides employed as electrode materials in Li ion batteries in accordance with claim 1, wherein detection of said raw material is conducted by means of X-ray diffraction analysis.

5. A manufacturing method for Li composite oxides employed as electrode materials in Li ion batteries having an $Li_{0.33}MnO_2$ composition, wherein a raw material mixture, in which one of manganese (IV) oxide and manganese oxyhydroxide is mixed with lithium hydroxide so that the Li:Mn atomic ratio is within a range of 1–1.2:3, is pulverized and mixed in an inert atmosphere and a chemical reaction is thereby caused, and the pulverization, mixing, and reaction are continued until said raw material can no longer be detected, whereupon heat treatment is conducted at a temperature of 350° C. or less.

6. A manufacturing method for Li composite oxides employed as electrode materials in Li ion batteries in accordance with claim 5, wherein said pulverization and mixing are conducted at a temperature of 350° C. or less.

7. A manufacturing method for Li composite oxides employed as electrode materials for Li ion batteries in accordance with claim 5, wherein said heat treatment is conducted in an inert gas.

8. A manufacturing method for Li composite oxides employed as electrode materials in Li ion batteries having an $LiMn_2O_4$ composition, wherein a raw material mixture, in which one of manganese (IV) oxide and manganese oxyhydroxide is mixed with lithium hydroxide so that the Li:Mn atomic ratio is within a range of 1–1.2:2, is pulverized and mixed in an inert atmosphere so as to cause a chemical reaction, and this pulverization, mixing, and reaction are continued until said raw material can no longer be detected, whereupon heat treatment is conducted at a temperature within a range of 450–750° C.

9. A manufacturing method for Li composite oxides employed as electrode materials for Li ion batteries in accordance with claim 8, wherein said heat treatment is conducted in an inert gas.

10. A manufacturing method for Li composite oxides employed as electrode materials in Li ion batteries having an $LiNiO_2$ composition, wherein a raw material mixture, in which one of nickel (II) oxide and nickel (II) hydroxide is mixed with lithium hydroxide so that the Li:Ni atomic ratio is within a range of 1–1.2:1, is pulverized and mixed in an inert atmosphere so as to cause a chemical reaction, and the pulverization, mixing and reaction are continued until the raw material can no longer be detected, whereupon heat treatment is conducted at a temperature within a range of 450–750° C.

11. A manufacturing method for Li composite oxides employed as electrode materials in Li ion batteries in accordance with claim 10, wherein said heat treatment is conducted in an oxygen atmosphere.

12. A manufacturing method for Li composite oxides employed as electrode materials in Li ion batteries having an $LiCoO_2$ composition, wherein a raw material mixture, in which one of metallic cobalt and cobalt (II) oxide is mixed with lithium hydroxide so that Li:Co atomic ratio is within a range of 1–1.2:1, is pulverized and mixed in an inert atmosphere, thereby causing a chemical reaction, and the pulverization, mixing, and reaction are continued until the raw material can no longer be detected, whereupon heat treatment is conducted at a temperature within a range of 450–750° C.

13. A manufacturing method for Li composite oxides employed as electrode materials for Li ion batteries in accordance with claim 12, wherein said heat treatment is conducted in an inert gas.

14. A manufacturing method for Li composite oxides employed as electrode materials in Li ion batteries having an $LiTi_2O_4$ composition, wherein a raw material mixture, in which one of metallic titanium and titanium oxide is combined with lithium hydroxide so that the Li:Ti atomic ratio is within a range of 1 1.2:2, is pulverized and mixed in an inert atmosphere, thereby causing a chemical reaction, and the pulverization, mixing, and reaction are continued until the raw material can no longer be detected, whereupon heat treatment is conducted at a temperature within a range of 450–750° C.

15. A manufacturing method for Li composite oxides employed as electrode materials for Li ion batteries in accordance with claim 14, wherein said heat treatment is conducted in an ambient atmosphere.

* * * * *